United States Patent [19]

Ohsaki et al.

[11] Patent Number: 5,237,858
[45] Date of Patent: Aug. 24, 1993

[54] METHOD FOR DETERMINING THE UNHYDRATION RATIO OF CEMENT CONTAINED IN CEMENT SLUDGE

[75] Inventors: Yukio Ohsaki; Fumio Iwase; Yoshihisa Nakanishi, all of Tokyo, Japan

[73] Assignee: Neotec Co., Inc., Tokyo, Japan

[21] Appl. No.: 863,436

[22] Filed: Apr. 3, 1992

Related U.S. Application Data

[62] Division of Ser. No. 717,998, Jun. 19, 1991, Pat. No. 5,178,455.

[30] Foreign Application Priority Data

Jul. 19, 1990 [JP] Japan ................... 2-191224

[51] Int. Cl.$^5$ .................... G01N 15/06; G01N 33/38
[52] U.S. Cl. .................... 73/61.72; 73/61.66
[58] Field of Search .............. 73/61.72, 61.69, 61.66, 73/61.71, 32 R

[56] References Cited

U.S. PATENT DOCUMENTS 4,118,794 10/1978 Nozaki et al. ................... 73/61.69
4,686,852 8/1987 Ito et al. ................... 73/61.72

FOREIGN PATENT DOCUMENTS 195137 11/1983 Japan ................... 73/61.72
126524 5/1989 Japan ................... 73/61.71

*Primary Examiner*—Hezron E. Williams
*Assistant Examiner*—Joseph W. Roskos
*Attorney, Agent, or Firm*—McAulay Fisher Nissen Goldberg & Kiel

[57] ABSTRACT

The present invention relates to a method and a system for recycling wash residue of ready mixed concrete include the steps of condensing used cement sludge to a predetermined concentration, storing the condensed sludge, sampling the stored sludge and determining the unhydration ratio of cement contained in the sludge, and weighing the stored sludge based on the determined unhydration ratio of cement in order to prepare a new batch of ready mixed concrete or mortar. By determining the unhydration ratio of cement contained in the sludge which has been condensed to a predetermined concentration, it becomes possible to accurately know the ratio of cement contributing as cement and its ratio contributing as the aggregate in a new batch of ready mixed concrete. A new batch of ready mixed concrete can be prepared by weighing the amount of the sludge on the basis of the determined unhydration ratio. The ready mixed concrete thus prepared will have a desired hardening strength and drying shrinkage.

8 Claims, 6 Drawing Sheets

METHOD FOR DETERMINING THE UNHYDRATION RATIO OF CEMENT CONTAINED IN CEMENT SLUDGE

This is a division of application Ser. No. 07/717,998, filed Jun. 19, 1991, now U.S. Pat. No. 5,178,455.

BACKGROUND OF THE INVENTION

1) Field of the Invention

The present invention relates to a technology for recycling the wash residue of ready mixed concrete or mortar (hereinafter ready mixed concrete, etc.) occurring as a result of washing conveyors or plant mixers in concrete mixing plants. More particularly, the present invention relates to a technology for preparing new ready mixed concrete, etc. by measuring the unhydration ratio of cement contained in the condensed sludge obtained from the wash residue of ready mixed concrete, etc., and then adding a predetermined amount of said condensed sludge to a new batch of ready mixed concrete.

2) Description of the Related Art

The wash residue of ready mixed concrete occurring in ready mixed concrete plants, etc. is high in alkaline value and contains toxic substances such as hexavalent chrome, and is therefore usually discarded and buried in remote areas.

Such wash residue is conventionally discarded because it will deteriorate the strength of concrete and increase the drying shrinkage when mixed with a new supply of ready mixed concrete.

The applicant of this invention proposed a method and system of recycling the wash residue of ready mixed concrete which can manufacture high quality concrete by taking out cement unhydrates from the wash residue without drying and mixing the unhydrates with a new batch of ready mixed concrete to thereby efficiently recycle resources (Japanese Patent Application laid-open Sho 62-204867).

According to this method of recycling, the wash residue is first classified in a wet process by a classifier, and the aggregates such as sands and gravels are removed to obtain cement sludges. The cement sludge is then condensed by a condenser, and concentration of the condensed sludge is further increased by a condensation tank to thereby obtain the cement sludge controlled to a predetermined concentration. The cement sludge is then crushed into fine particles with a vibrating ball mill to obtain a sludge containing fine sludge particles as the disperse phase on the surface of which cement unhydrates appears.

The wash residue of used ready mixed concrete, etc. decreases in its unhydration ratio of cement depending on its age. If the amount of sludge to be admixed with new supply of concrete, etc. is determined uniformly by assuming that the unhydration ratio of cement contained in the sludge which has been crushed as mentioned above is constant, there occurs such inconveniences as fluctuation in strength or drying shrinkage when the new batch of ready mixed concrete, etc. becomes hardened.

SUMMARY OF THE INVENTION

An object of the present invention is to provide a method and a system for efficiently recycling the wash residue of ready mixed concrete, etc. which may cause pollution.

Another object of the present invention is to provide a method of recycling the wash residue of ready mixed concrete, etc. which may further improve the quality of ready mixed concrete, etc. in terms of hardening strength and drying shrinkage, etc. of the concrete, etc. prepared anew by adding the condensed sludge obtained from the wash residue of concrete.

Still another object of the present invention is to provide a simplified method of determining unhydration ratio of cement sludge and a system therefor.

In order to attain such objects, the method of recycling wash residue of ready mixed concrete, etc. according to the present invention includes, as shown in FIG. 1, Step 1 in which used cement sludge is condensed to a predetermined concentration, Step 2 in which the condensed sludge is stored, Step 3 in which the stored sludge is sampled and determined the unhydration ratio of cement contained in the sludge, and Step 4 in which the stored sludge is weighed based on the unhydration ratio of cement to prepare a new batch of ready mixed concrete, etc. The Step 4 is followed by Step 5, in which a new batch of ready mixed concrete, etc. is prepared. It is more preferable to insert Step 6 after the Step 1 of condensing the sludge, in which the condensed sludge is crushed into fine particles so that the unhydration ratio of cement is determined with respect to the crushed sludge.

The system for recycling the wash residue of ready mixed concrete, etc. according to the present invention comprises, as shown in FIG. 2, a condenser 10 for condensing used cement sludge 12 to a sludge 49 of a predetermined concentration, a storage tank 20 for storing the condensed sludge 49, a device 30 for determining the unhydration ratio of cement contained in the sludge 49 which is sampled in the tank 20, and a weighing device 40 for weighing the sludge 49 from the tank 20 in an amount determined based on the unhydration ratio to prepare a new batch of ready mixed concrete, etc. More preferably, the system includes a pulverizer 60 for crushing the sludge 49 stored in the tank 20 into fine particles, a storage tank 70 for storing crushed sludge 67, a device 30 determining the unhydration ratio of cement contained in the sludge 67 and a weighing device 40 for weighing the sludge 67 from the tank 70 in an amount determined based on the unhydration ratio to prepare a new batch of ready mixed concrete, etc.

By determining the unhydration ratio of cement contained in the sludge 49 or 67 which has been condensed to a predetermined concentration, it becomes possible to accurately know the ratio of cement contributing as cement and its ratio contributing as the aggregate in a new batch of ready mixed concrete. Thus, a new batch of ready mixed concrete can be prepared by weighing the amount of the sludge 49 or 67 on the basis of the determined unhydration ratio. The ready mixed concrete thus prepared will have a desired hardening strength and drying shrinkage.

BRIEF DESCRIPTION OF THE DRAWINGS

These and other objects as well as advantages of this invention will become more apparent from the description of preferred embodiments of this invention with reference to the accompanying drawings, in which.

DESCRIPTION OF THE PREFERRED EMBODIMENT

Figure 1:
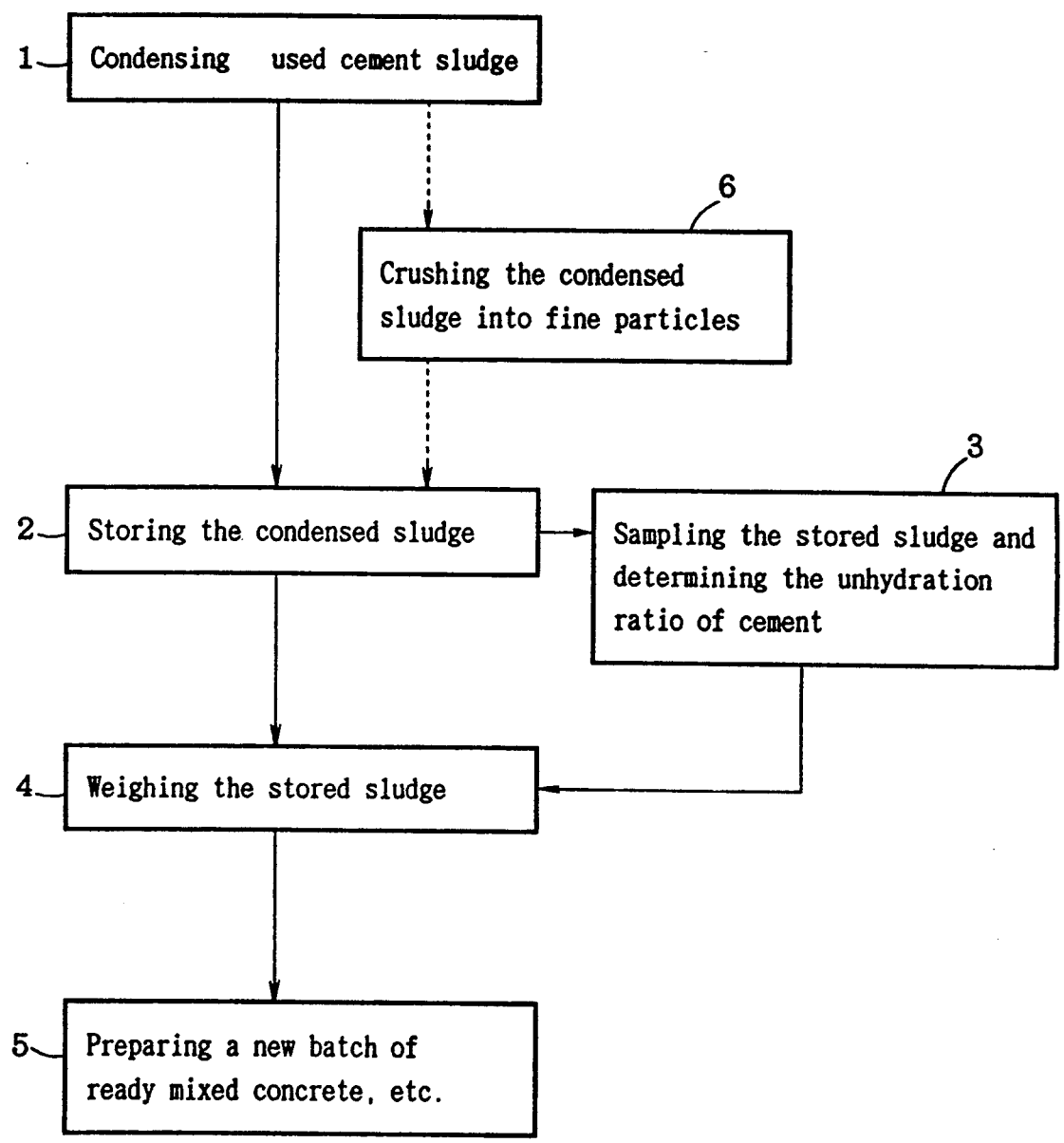
FIG. 1 is a block diagram to explain the method of recycling the wash residue from ready mixed concrete, etc., according to the present invention.
Figure 2:
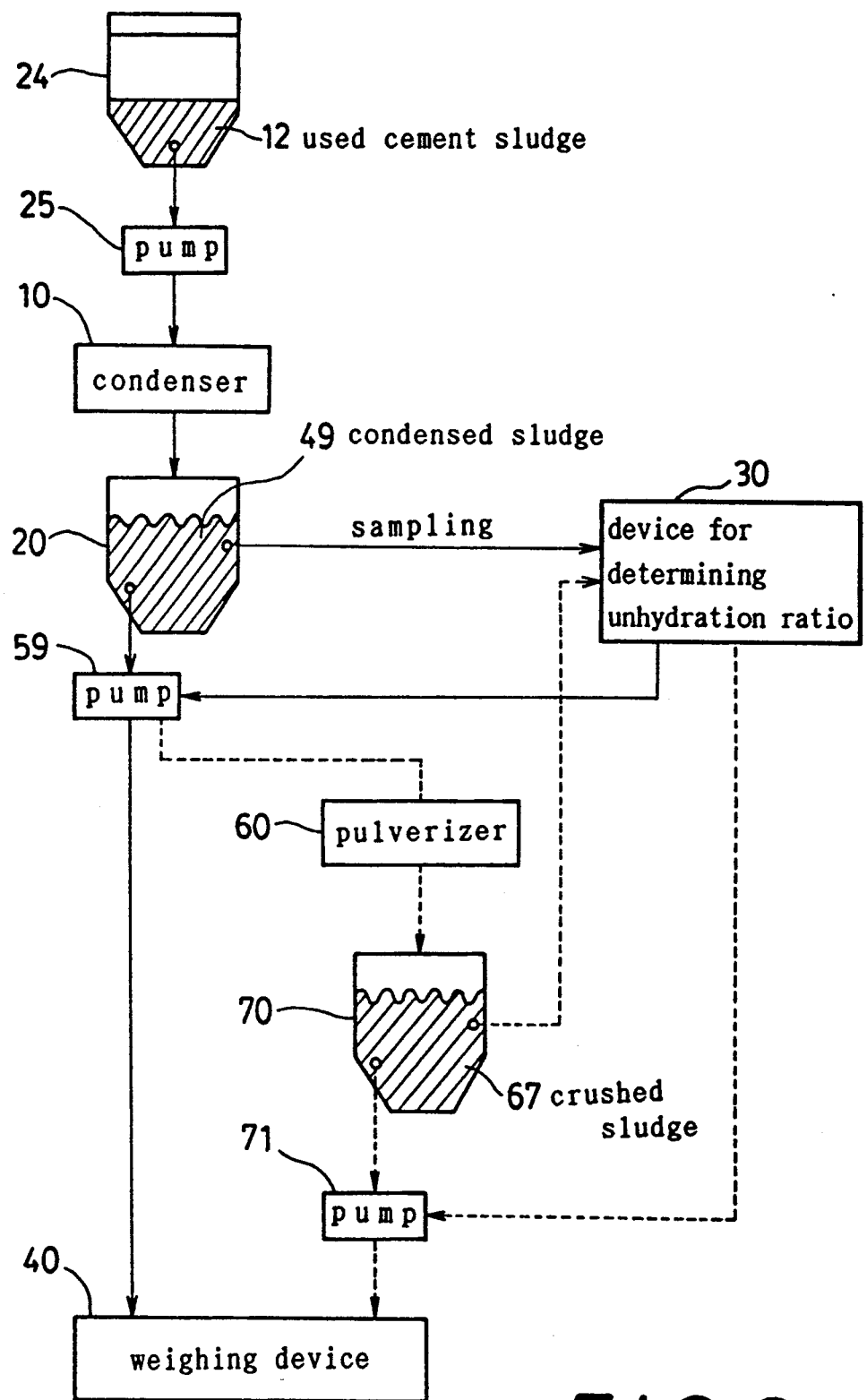
FIG. 2 is a schematic view to show the system according to the present invention.
Figure 3:
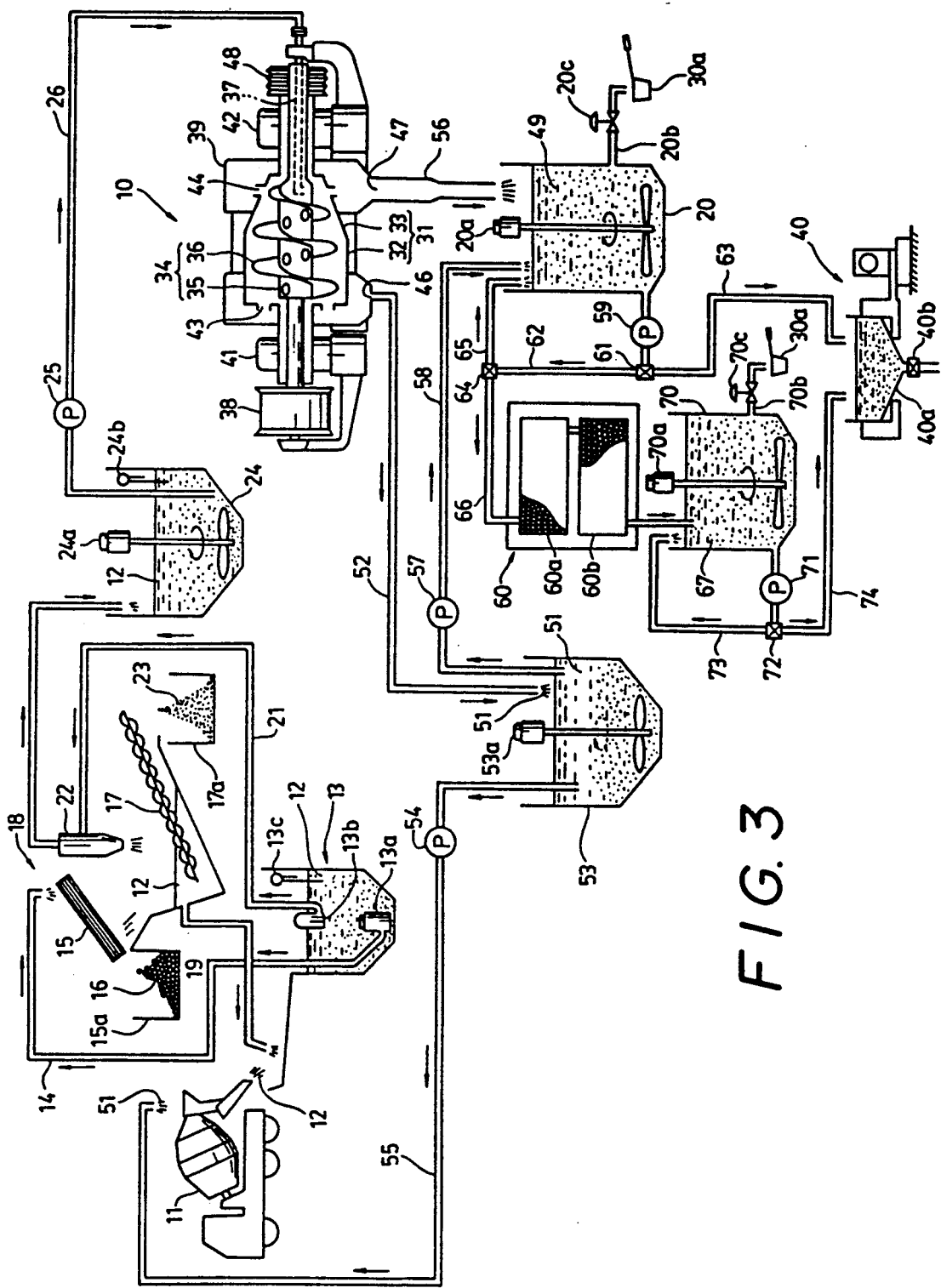
FIG. 3 is a structural view of the system for utilizing the wash residue in accordance with the present invention.

Referring to FIGS. 2 and 3, wash residue or cement sludge 12 obtained from washing a truck mixer 11 is recovered in a recovery tank 13 and then supplied to a wedge filter 15 via a duct 14 by means of a pump 13a provided at the bottom of the tank 13. Gravels 16 are filtered by the filter 15 and stored in a chamber 15a. The sludge 12 removed of its gravels 16 is supplied to spiral classifier 17 to be removed of sands 23 and then stored in a chamber 17a. The filter 15 and the classifier 17 constitute the classifying means 18. The sludge 12 remaining on the classifier 17 is returned to the tank 13 via a duct 19.

As the sludge 12 in the tank 13 reaches a given level, a level gage switch 13c closes to operate a pump 13b. The sludge 12 is transferred into a tank 24 for the sludge by the pump 13b via a duct 21 and a cyclone 22. Residual sands in the sludge are separated by the cyclone 22 and returned to the classifier 17. The sludge 12 in the tank 24 is a suspension comprising water as the dispersion medium and the hydrates and unhydrates of cement as the disperse phases. The sludge 12 is approximately 5% in concentration, and is slowly stirred by a stirrer 24a to prevent hardening. The level gage switch 24b closes to activate the pump 25 when the sludge 12 reaches a given level. The pump 25 feeds the sludge 12 into the condenser 10 via the duct 26.

The condenser 10 comprises a centrifugal separator which includes an outer drum bowl 31, inner drum screw 34, feed pipe 37, gear box 38 and casing 39. The cylindrical portion 32 and a conical portion 33 are integrally molded to form the outer drum bowl 31, and the opposite ends of the bowl 31 are rotatably supported by bearings 41 and 42. An outlet port 43 and an outlet port 44 are provided at the end having the larger diameter and the end having the smaller diameter, respectively. The inner drum screw 34 is provided with screw vanes 35 and ejection ports 36, and is rotatably supported inside the cylindrical portion 32 and the conical portion 33.

The feed pipe 37 is arranged within the screw 34 to guide the sludge transferred via the duct 26 into the inner drum screw 34. The casing 39 envelopes the outer drum bowl 31 and is provided with an outlet 46 for separated liquid on the side of the outlet port 43 and with an outlet 47 for condensed sludge on the side of the outlet port 44.

The gear box 38 comprises a planetary gear driven by the pulley 48. The gear box 38 drives the outer drum bowl 31 and the inner drum screw 34 to rotate in the same direction and in such a manner that the rotational speed of the inner drum screw 34 becomes slightly slower than that of the outer drum bowl 31. The centrifugal force caused by the rotation of the outer drum bowl 31 and the inner drum screw 34 is preferably in the range of from 100 to 4,000 G, and more preferably between 800 and 1,5000 G. When the centrifugal force is smaller than 100 G, it becomes difficult to separate the sludge 12 into condensed sludge 49 and separated liquid 51 to be described. On the other hand, if the force exceeds 4,000 G, the condensed sludge 49 becomes adhered on the inner surfaces of the cylindrical portion 32 or the conical portion 33, making it difficult to discharge the sludge.

Figure 4:
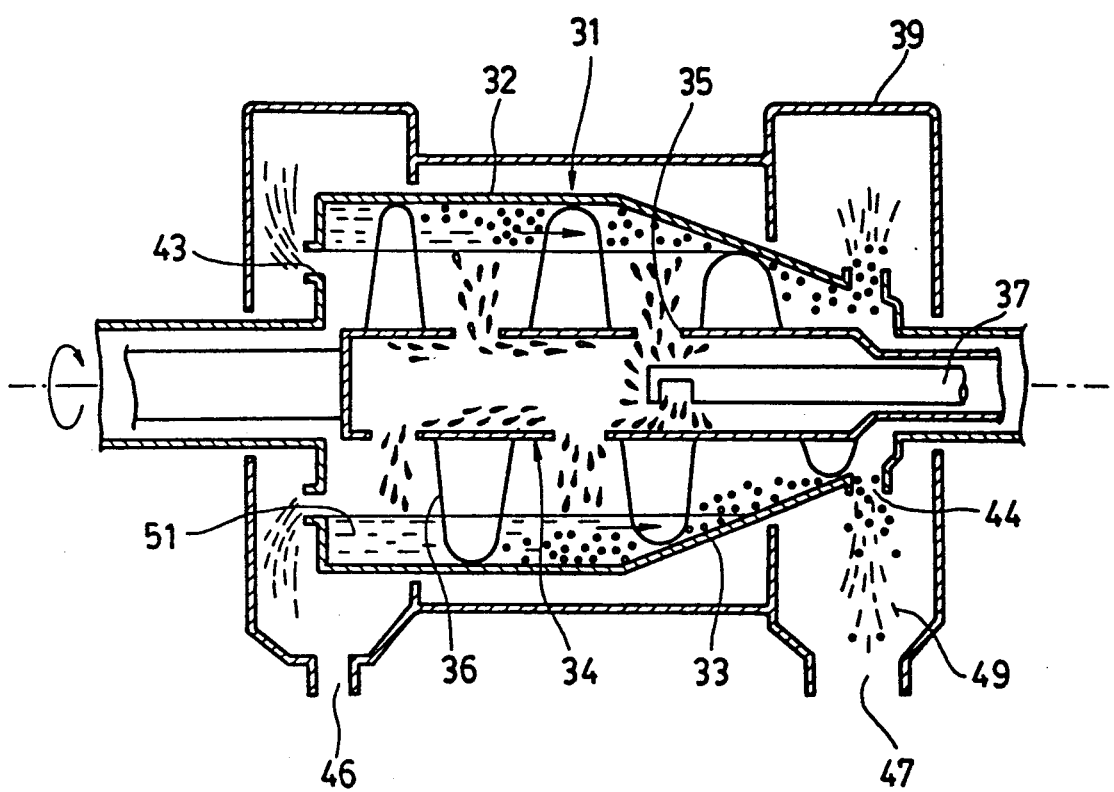
FIG. 4 is a partially enlarged view to show the essential parts of the condenser.

As shown in FIG. 4, when the sludge fed by the pump 25 is introduced into the inner drum screw 34 via the feed pipe 37 of the condenser 10 while the gear box 38 is being driven, the condensed sludge 49 containing cement unhydrates with higher specific gravity as its main component is deposited on the inner wall of the cylindrical portion 32 in the outer drum bowl 31 by the centrifugal force. The condensed sludge 49 is transferred to the conical portion 33 as indicated by the arrow in the figure by the rotation of the screw vanes 36 of the inner drum screw 34, and then discharged from the outlet 47 via the outlet port 44. The condensed sludge 49 to be discharged is 60 to 70% in concentration. The separated liquid 51 in the inner drum screw 34 and containing sludges having the smaller specific gravity is ejected from the outlet 46 via the outlet port 43 and transferred into the tank 53 for the separated liquid via the duct 52. The separated liquid 51 contains 5 to 15% of hydrated components and components that are considered to be unhydrated as the suspended solids. The separated liquid 51 in the tank 53 is recycled by the pump 54 via the duct 55 to be used as the washing liquid for the concrete adhered on the wall of the truck mixer 11. Here, hydrated components and components considered to be unhydrated are adsorbed by the gravels and sands and are stored in the chambers 15a and 17a, respectively.

The condensed sludge 49 discharged from the outlet 47 is guided by the duct 56 into the tank 20 for the condensed sludge provided directly below the outlet 47. The separated liquid 51 stored in the tank 53 is supplied into the tank 20 by the pump 57 via the duct 58. The condensed sludge 49 is diluted to a predetermined concentration by supplying the separated liquid 51 and by stirring with the stirrer 20a. In this example, the sludge concentration is adjusted to fall within the range of from 30 to 40%. A sampling tube 20b is connected to the tank 20, and a valve 20c is provided at a midpoint of the tube 20b. The reference numeral 30a denotes a container for the sampled sludge.

The sludge 49 of a predetermined concentration is fed into the duct 62 or 63 by the pump 59 via the switch valve 61. The condensed sludge fed to the duct 62 is further sent to the duct 65 or 66 via the switch valve 64. The condensed sludge sent into the duct 63 is sent to the tank 40a of the weighing means 40 for the sludge. A discharge valve 40b is provided at the lower end of the tank 40a. A plant mixer (not shown) is arranged below the discharge valve 40b so that the sludge will drop into the plant mixer by its own weight when the discharge valve 40b is opened.

In order to supply the condensed sludge 49 in the tank 20 to the weighing device 40 by bypassing the pulverizer 60 to be described below, the switch valve 61 is switched to communicate with the duct 63 and a predetermined amount of sludge 49 is fed, whereupon the switch valve 64 is switched to communicate with the duct 65 to return the excess condensed sludge into the tank 20.

In order to supply the sludge 49 in the tank 20 to the pulverizer 60, the switch valve 61 is switched to communicate with the duct 62 and the switch valve 64 is switched to communicate with the duct 66. The sludge 49 charged into the pulverizer 60 via the duct 66 is crushed into fine particles. In this example, the pulverizer 60 is a vibrating ball mill comprising a first stage mill 60a and a second stage mill 60b. The sludge 67 crushed into fine particles by vibration is then transferred into the tank 70 for crushed sludge and kept stored while being agitated with the stirrer 70a to prevent hardening. The disperse phase of the crushed sludge 67 is the fine particles of sludge having a higher content of cement unhydrates. The sampling tube 70b is connected to the tank 70 and a valve 70c at the midway of the tube 70b. The reference numeral 30a denotes a container for the sampled sludge.

The crushed sludge 67 in the tank 70 is fed into the duct 73 or 74 by the pump 71 by means of the switch valve 72. In order to supply the crushed sludge 67 from the tank 70 into the weighing device 40, the switch valve 72 is switched to communicate with the duct 74 to supply a predetermined amount of the crushed sludge 67, whereupon, the switch valve 72 is switched to communicate with the duct 73 to return the excess crushed sludge into the tank 70.

Since the content of the cement unhydrates is high when the wash residue from the mixer 11 is young in age, the condensed sludge 49 is directly charged into the tank 40a attached to the weighing device 40a via the duct 63 by bypassing the pulverizer 60. On the other hand, if the wash residue from the mixer is aged, the content of the cement hydrates is high, so that the condensed sludge is subjected to crushing in the pulverizer 60 to obtain the crushed sludge 67 containing the fine particles of the sludge as the disperse phase and the cement unhydrates appearing on the surface. The crushed sludge 67 is subsequently transferred into the tank 40a of the weighing device 40 via the duct 74.

Figure 5:
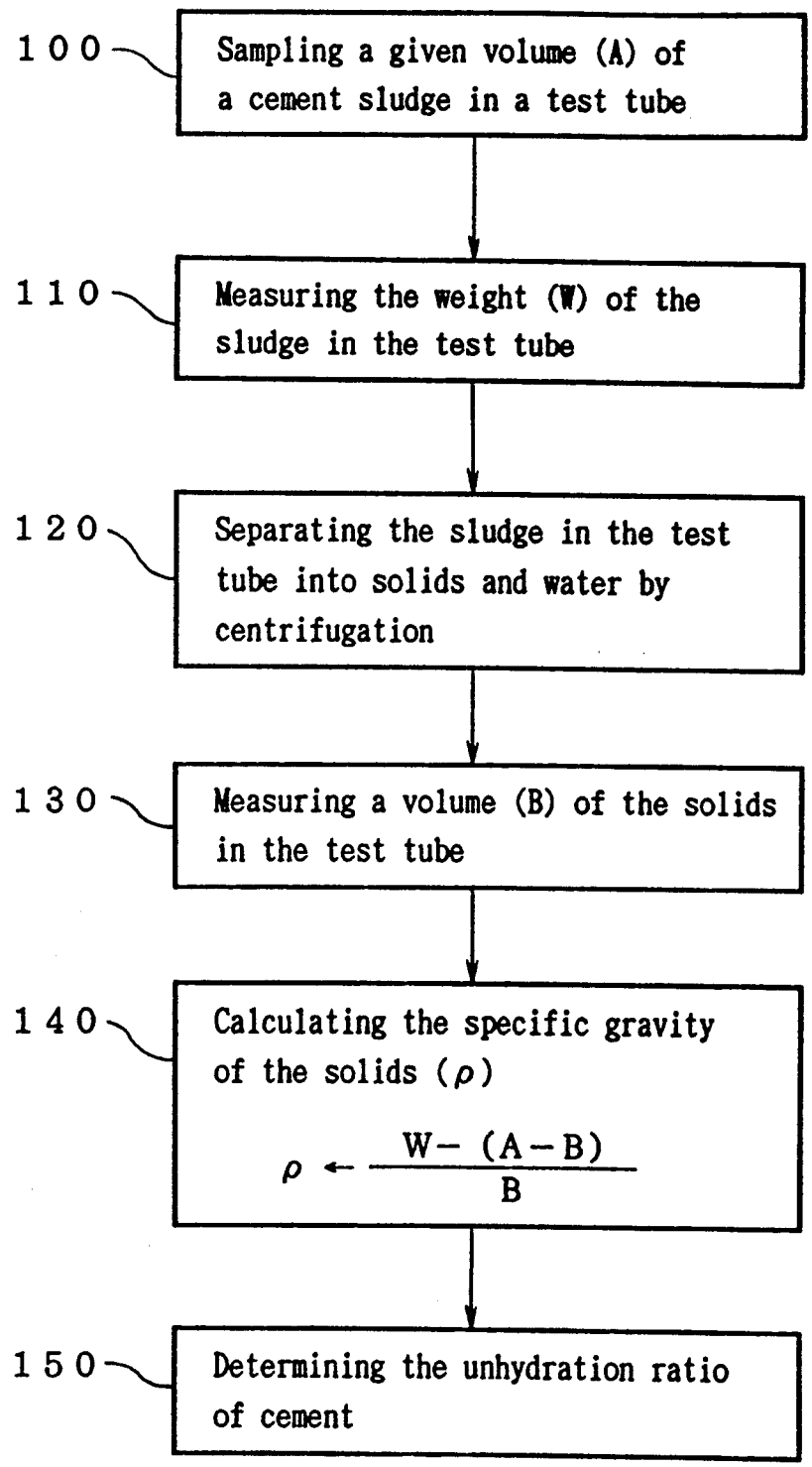
FIG. 5 is a block diagram to explain the method for determining the unhydration ratio of cement.

Referring to FIG. 5, the method of determining the unhydration ratio of cement contained in the sludge 49 or 67 is explained, in order to decide an amount of the sludge 49 or 67.

As indicated by the reference numeral 100, the sludge 49 or 67 contained in the container 30a is sampled by a test tube in a predetermined volume A, for example 22 ml. The test tube used here has a predetermined volume capacity and the shape. As indicated by the reference numeral 110, the weight W (g) of the sludge in the test tube is measured. To do this, the weight of every test tube is measured in advance. As indicated by the reference numeral 120, the sludge in the test tube is subjected to centrifugation at a given force, e.g. 3000 G for a given period of time, e.g. 5 minutes to separate the water containing sludge into solids and water. Upon centrifugation, a water phase and a solid phase will be formed in the test tube. As indicated by the reference numeral 130, the centrifuged sludge in the test tube is optically analyzed to determine a volume B (cm$^3$) of the solids in the sludge. As indicated by the reference numeral 140, the specific gravity $\rho$ of the solids in the sludge is calculated by the following equation (1)

$$\frac{W - (A - B)}{B} = \rho \quad (1)$$

As indicated by the reference numeral 150, the unhydration ratio of cement contained in the sludge 49 or 67 is determined depending on the value of specific gravity thus determined by referring to a table which is prepared in advance and which shows the relation between the specific gravity and the unhydration ratio.

TABLE 1

| Material age (time elapsed in hydration) | | Specific gravity of the solids in the water containing sludge | Unhydration ratio (%) |
|---|---|---|---|
| hour | day | | |
| 2 | | 1.850 | 100 |
| 4 | | 1.766 | 85.7 |
| 8 | | 1.682 | 71.8 |
| 16 | | 1.514 | 42.7 |
| 24 | 1 | 1.433 | 28.8 |
| 48 | 2 | 1.417 | 26.1 |
| 72 | 3 | 1.400 | 23.2 |
| 96 | 4 | 1.384 | 20.5 |
| 120 | 5 | 1.367 | 17.6 |
| 144 | 6 | 1.351 | 14.8 |
| 168 | 7 | 1.344 | 13.7 |
| 240 | 10 | 1.332 | 11.6 |
| 336 | 14 | 1.317 | 9.0 |
| 672 | 28 | 1.264 | 0 |

Table 1 is an example that shows the unhydration ratio as against the specific gravity. The specific gravity of a sludge sample with a known history of hydration is repeatedly measured to obtain the mean value. The unhydration ratio at the material age of 2 hours is given as 100% and the unhydration ratio at the age of 28 days is given as 0% based on the mean value obtained by the measurements. By proportionally distributing these values, the unhydration ratios corresponding to respective specific gravities are obtained.

Figure 6:
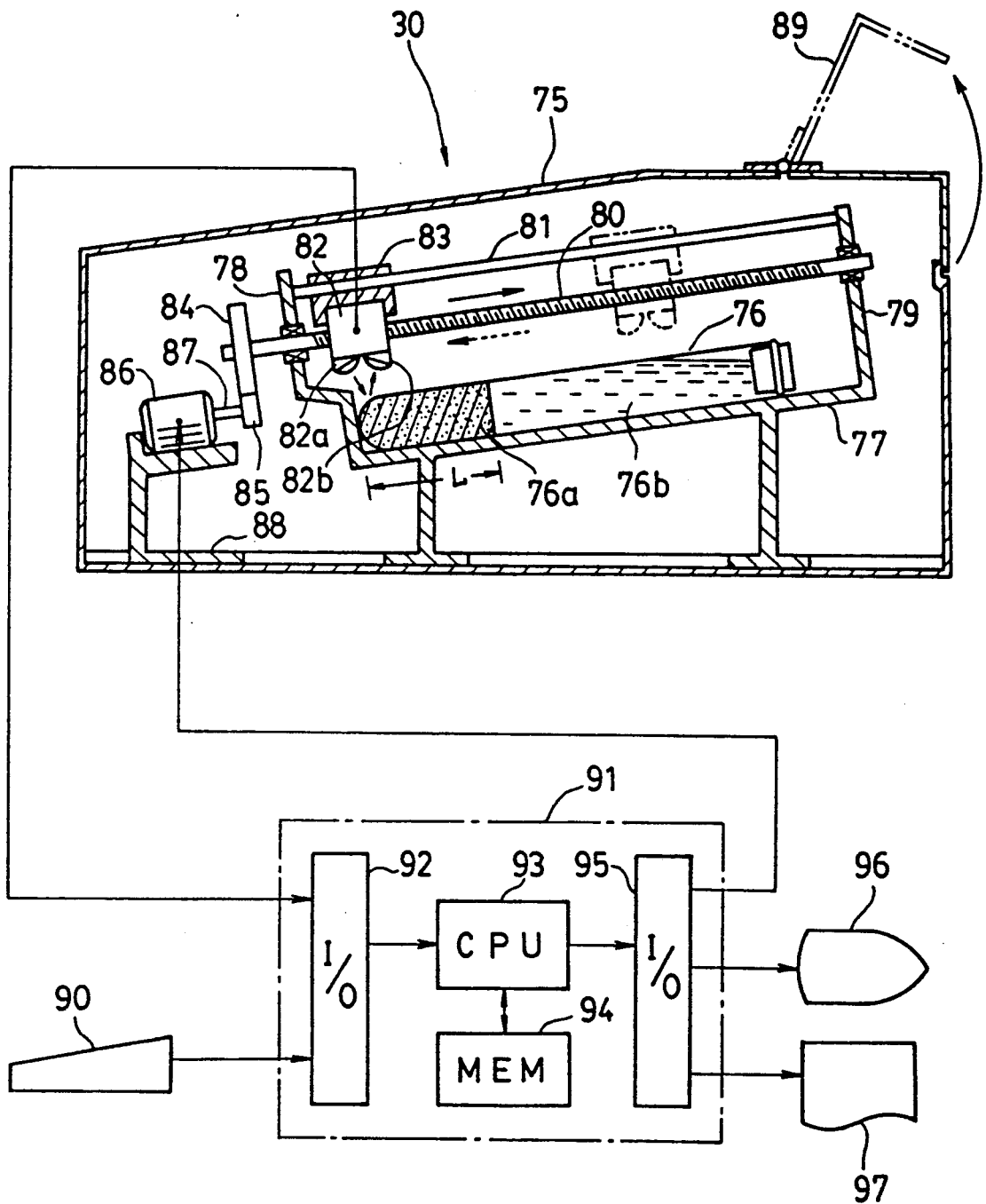
FIG. 6 is a structural view of the apparatus for determining the unhydration ratio of cement.

FIG. 6 shows a structural view of the device 30 for determining the unhydration ratio. Inside the housing 75 of the device 30 is provided a base 77 on which a test tube 76 is fixed. The test tube 76 contains 22 ml of cement sludge, which is separated into a solid phase 76a and a water phase 76b by centrifugal force. A screw shaft 80 is suspended rotatably between the two opposite side walls 78, 79 of the base 77. A guide rod 81 is fixed in parallel to the shaft 80. An optical sensor 82 is screwed to the shaft 80, and a slider 83 is slidably provided on the rod 81.

The optical sensor 82 comprises a light emitting device 82a which emits infrared rays onto the side face of the test tube 76 and a light receiving device 82b which receives the light reflected from said side face. A gear 84 to be driven is fixed to the lower end of the shaft 80. The driving gear 85 which engages with the gear 84 is in turn fixed to the shaft 87 of the stepping motor 86. The motor 86 is fixed to the base 88. The optical sensor 82 is so constructed that it is guided by the rod 81 from the lower end of the test tube to its upper end when the motor 86 rotates. A lid 89 is pivotally provided at the top of the housing 75 to allow the test tube to be taken in and out.

The detection output of the optical sensor 82 and the output of an input unit 90 are connected to CPU 93 via an input interface 92 of a microcomputer 91. The CPU 93 is connected with a memory 94, which stores the volume B (cm$^3$) of the solid content of the sludge which corresponds to the amount of the displacement of the optical sensor 82, the given volume A (e.g. 22 ml) of the sludge, and the equation (1) for determining the specific gravity as mentioned above. The output of the CPU 93 is connected to the stepping motor 86, the display panel 96 of liquid crystal and the printer 97 via the output interface 95.

When the weight W (g) of the sludge contained in the test tube 76 is inputted from the input unit 90, the motor 86 is activated. The optical sensor 82 then moves from the lower end of the test tube 76 toward the upper end thereof to detect the difference in the reflectivity of infrared ray between the solid and water phases, or the length L (mm) of the solid content of the sludge. The result of detection is inputted at the microcomputer 91. Based on the length L (mm), the computer 91 reads out the volume B (cm$^3$) of the solids 76b in the water containing sludge from the memory 94. Based on the volume B and the weight W of the sludge initially inputted and the equation (1), the specific gravity of the solid content 76a in the sludge is calculated. These numerical figures are displayed on a liquid crystal display panel 96 and are simultaneously printed out on a recording paper by means of a printer 97.

By referring to a table such as Table 1 shown above, the unhydration ratio of cement in the test tube 76, or the sludge 49 or 76 thus sampled, can be estimated based on the specific gravity thus obtained.

It is also possible to utilize the memory 94 of the computer 91 for storing the Table 1, so that the unhydration ratios can be automatically displayed on the panel 96 and printed by the printer 97. Alternatively, the computer 91 may be used to calculate the volume B of the solids 76a in the sludge, or the ratio b by volume of the solids 76a as against the sludge. The value thus obtained can be substituted in the equation (1) or equation (2) given below to carry out the calculation manually.

$$\frac{W - (1 - b)}{A \times b} = \rho \quad (2)$$

Based on the measurements obtained by the device 30, the amount of sludge 49 or 67 to be supplied and mixed to obtain a new batch of cement is determined. The switch valve 61 or 72 is then switched so that the sludge may be supplied into the tank 40a in an amount thus determined. The switching is controlled by the amount to be weighed by the weighing device 40. When weighing of the sludge is completed, the sludge 49 or 67 is supplied into the plant mixer by its own weight as the discharge valve 40 of the tank 40a is opened. This fresh supply of the sludge 49 or 67 is mixed with a new batch of ready mixed concrete in the plant mixer.

As has been described in the foregoing, the present invention method makes it possible to easily estimate the unhydration ratio of cement contained in the wash residue of ready mixed concrete with its history of hydration unknown by utilizing the fact that the specific gravity of the cement particles decreases due to hydration. This in turn makes it possible to accurately determine the amount of condensed sludge obtained from the wash residue as well as respective ratios of its components contributing as cement and aggregate when the sludge is admixed in a new batch of ready mixed concrete.

As a result, the amount of condensed sludge to be added to prepare a ready mixed concrete anew can be calculated and weighed based on the unhydration ratio of cement contained in the condensed sludge. The resultant ready mixed concrete will have a desired hardening strength, drying shrinkage, etc. At the same time, the wash residue which is otherwise the cause of pollution can be effectively utilized.

The method of determining the unhydration ratio of cement according to the present invention is capable of obtaining accurate measurements in a short period of time in a very simple manner.

What is claimed is:

1. A method for determining the unhydration ratio of cement contained in cement sludge comprising the steps of:

a) obtaining a given volume (A) of the cement sludge;
   b) measuring the weight (W) of the sludge;
   c) separating the sludge into solids and water;
   d) measuring the volume (B) of the solids;
   e) calculating the specific gravity of the solids ($\rho$) from equation $$\frac{W - (A - B)}{B} = \rho; \text{ and} \quad (1)$$

f) determining the unhydration ratio from a predetermined correlation of sludge specific gravity and unhydration ratio.

2. The method of claim 1 wherein the sludge is separated into solids and water by centrifugation.

3. The method of claim 1 wherein the value is measured by optical analysis.

4. An apparatus for determining the unhydration ratio of cement comprising:
   a chamber of known weight;
   means for introducing a pre-determined volume of cement sludge into said chamber;
   means for determining the weight of cement sludge introduced into the chamber;
   means for separating the cement sludge in said chamber into solids and water; and
   means for determining the volume of the centrifuged solids in said chamber.

5. The apparatus of claim 4 wherein the separating means is a centrifuge.

6. The apparatus of claim 4 wherein the chamber is transparent.

7. The apparatus of claim 6 wherein the means for determining the volume of solids in the chamber is an optical sensor having a light emitting device for emitting light into the chamber and a light sensitive device for receiving light reflected from the chamber.

8. The apparatus of claim 4 wherein the chamber is a transparent test tube and the means for determining the volume of solids is an optical sensor having:
   a light emitting device for emitting light into said chamber;
   a light sensitive device for receiving light reflected from said chamber; and
   means for moving said sensor so as to scan said chamber; and
   which further comprises means for calculating the specific gravity from the weight and volume of the solid.

* * * * *